United States Patent [19]

Moroto et al.

[11] Patent Number: 5,775,449

[45] Date of Patent: Jul. 7, 1998

[54] HYBRID VEHICLE

[75] Inventors: Shuzo Moroto; Kozo Yamaguchi, both of Aichi-ken, Japan

[73] Assignee: Kabushikikaisha Equos Research, Japan

[21] Appl. No.: 507,514

[22] PCT Filed: Jun. 6, 1995

[86] PCT No.: PCT/JP95/01109

§ 371 Date: Aug. 21, 1995

§ 102(e) Date: Aug. 21, 1995

[30] Foreign Application Priority Data

Jun. 6, 1994 [JP] Japan .................. 6-147078

[51] Int. Cl.$^6$ .................................................. B60K 6/04
[52] U.S. Cl. ..................... 180/65.2; 180/65.4; 180/65.7; 477/4; 477/5
[58] Field of Search ................. 180/65.2, 65.6, 180/65.7, 65.4; 477/2, 3, 4, 5, 6

[56] References Cited

U.S. PATENT DOCUMENTS

| | | | |
|---|---|---|---|
| 3,478,851 | 11/1969 | Smyth et al. | 477/5 |
| 3,566,717 | 3/1971 | Berman et al. | |
| 3,923,115 | 12/1975 | Helling | 180/65.2 |
| 4,233,858 | 11/1980 | Rowlett | 180/65.2 |
| 5,343,970 | 9/1994 | Severinsky | 180/65.2 |
| 5,359,308 | 10/1994 | Sun et al. | 180/65.2 |
| 5,443,130 | 8/1995 | Tanaka et al. | 180/65.6 |

Primary Examiner—Brian L. Johnson
Assistant Examiner—Avraham H. Lerner
Attorney, Agent, or Firm—Lorusso & Loud

[57] ABSTRACT

A hybrid vehicle is capable of complying with a request for immediate acceleration while the vehicle is moving at a low speed and of being powered by a motor small in size so that the vehicle can be small in size and light in weight. The driving force of engine is supplemented by that of a motor. An output shaft is provided between the engine and the motor. A controller responds to a high torque requirement by increasing engine torque. When the vehicle moves normally, the engine is operated in an output range of high efficiency and low-pollution with output to an output shaft shared by a generator and motor, and while the generator generates electric-power, the engine output is combined with the output of the motor to drive the vehicle wheels. On the other hand, when high torque is required, since the electric power generation by the generator is suspended and the engine torque is increased, the output transferred from the engine to the drive shaft 1b is increased in proportion to the increase of the engine speed, with the result that desired driving state of the vehicle is ensured.

22 Claims, 9 Drawing Sheets

HYBRID VEHICLE

TECHNICAL FIELD

The present invention relates to a hybrid vehicle using a combustion engine, such as a gasoline engine, diesel engine or a gas-turbine engine, in combination with an electric motor powered by an electrical energy source such as a battery.

BACKGROUND ART

As disclosed in U.S. Pat. No. 3,566,717, it is well-known for a hybrid vehicle to run its engine at a predetermined output to be able to move the vehicle effectively with reduced exhaust gas and to use a motor as an auxiliary power source for the vehicle in order to drive the vehicle with high efficiency and low-pollution. The aforementioned type of the hybrid vehicle needs a defined driving force to realize a comfortable driving state.

However, since the engine is driven with high efficiency and low-pollution in the aforementioned hybrid vehicle, if the engine is controlled to output a predetermined engine power, the output would be insufficient when the vehicle is rapidly accelerated from low speed. Because, the engine output can be considered the product of an engine output torque and an engine speed and because the engine output torque is nearly constant, regardless of the engine speed, the engine output is thus reduced when the vehicle moves at a low speed with the lower engine speed.

Figure 14:
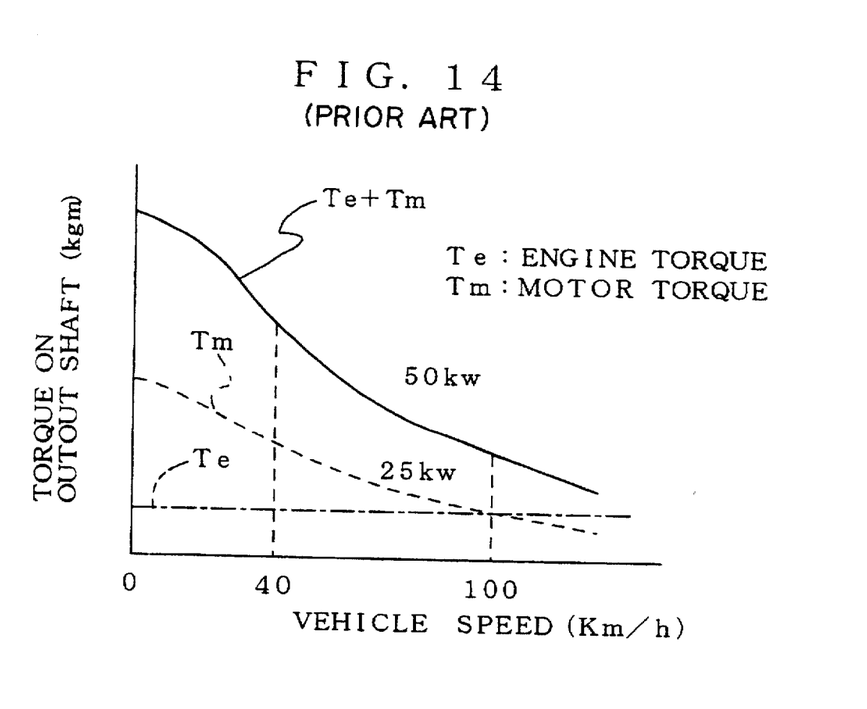
FIG. 14 is a graph of output torque versus vehicle speed for a conventional hybrid vehicle.

FIG. 14 illustrates normal output of the hybrid vehicle as described above. For example, as shown in the drawing, since an output of 50 KW is required when the hybrid vehicle moves, and if the engine output is defined as 25 KW and the motor output is defined as 25 KW to produce a vehicle speed of 100 km/h, the motor output is held at 25 KW but the engine output is reduced to 10 KW for a vehicle speed of 40 km/h, a deficient of 15 KW.

Conventionally, a relatively large motor or inverter is required to ensure the output needed when the hybrid vehicle moves at a low speed, so that it is difficult for the vehicle to be designed small in size and light in weight.

Thus, it is an object of the present invention to provide the hybrid vehicle with the capability of complying with a command to rapidly accelerate received while the vehicle is moving at a low speed and to reduce the size of the motor, so as to allow the vehicle to be designed small in size and light in weight.

SUMMARY OF THE INVENTION

To overcome the disadvantages of the above conventional art, the present invention provides: a hybrid vehicle including an internal combustion engine, a motor, torque adjusting means (T) provided between the engine and the motor for alternatively switching between a normal state and an engine torque increasing state, and control means (S) for controlling, in response to a command signal, speed of the engine and for switching the torque adjusting means (T) to its torque increasing state.

In normal operation of the vehicle as described above, the driving efficiency of the engine is excellent and the engine is operated within a range of engine speed which maintains a low-pollution state, and the vehicle is driven with the combined output of the engine and the motor. When a torque increase is required, the engine speed of the engine is increased by the control means (S) while the torque is increased by the torque adjusting means (T) and the engine torque output is combined with the torque of the motor, so that the vehicle can powered in the desired driving state.

The aforementioned torque adjusting means (T) includes, for instance, a differential gear system composed of three factors, a first element which is connected with the engine, a second element which is connected with a driving shaft and the motor and a driving shaft and a third element which is connected with a generator.

Thus, the output of the engine is transferred to the output shaft without an electrical exchange.

The aforementioned torque adjusting means (T) is composed, for instance, of a differential gear system capable of changing the input-output gear ratio by operation of frictional engagement means (F) in plural steps.

The control means (S) includes a slip control means (S1) for regulating slip of the frictional engagement means (F) in response to the speed variation of the engine in order to bring the engine speed of the engine to a target engine speed. Therefore, the driving force of the engine is smoothly transferred through the differential gear system while keeping the desired engine speed.

Furthermore, the vehicle includes a detecting means to output the command signal obtained to the control means by detecting, for example, a low-speed state and an immediate accelerating requiring state of the engine. Accordingly, even when the speed of the engine is held at a predetermined engine speed, the torque needed to move the hybrid vehicle is transferred through the differential gear system.

In one preferred embodiment the differential gear system is composed of a carrier connected with an engine output shaft; a sun gear fixed to a motor output shaft; and a ring gear connected with the generator. The control means includes a clutch for connecting the engine output shaft and the motor output shaft responsive to the command signal. In this embodiment, the torque of the engine is changed in two steps by the differential gear system and is combined with the torque generated by the motor, through the differential gear system, by controlling ON/OFF switching of the clutch.

In another preferred embodiment the differential gear system is composed of: a first sun gear fixed to the engine output shaft; a generator axially aligned with the engine output shaft and adapted to release in response to a requirement for high load; a second sun gear fixed to an input shaft connecting with the generator; a first pinion meshing with the first sun gear and a second pinion integral with the first pinion and meshing with the second sun gear; a ring gear meshing with one of the first and second pinions; a brake for braking the ring gear on the case when the engine is rapidly accelerated from a low engine speed; and a carrier connected through gears with the motor output shaft and rotatably supported on the input shaft and supporting the integral first and second pinions. In this latter embodiment also, the torque of the engine is changed in two steps by means of the differential gear system and is combined with the torque generated by the motor.

In yet another embodiment, the differential gear system is composed of: a carrier united with the engine output shaft; a first pinion supported by the carrier; a generator oriented axially aligned with the engine output shaft and adapted to release in response to a high load requirement; a first sun gear meshing with the first pinion and connecting with an input shaft for the generator; ring gears rotatably supported on the engine output shaft and meshing with the first pinion; a second sun gear meshed with the first pinion and rotatably supported on the input shaft connecting with the generator; a second pinion meshing with the second sun gear; and a brake for braking the second sun gear in response to a high load requirement. A one-way clutch is provided between the aforementioned second sun gear and the brake to allow the second sun gear to rotate in the same direction as the first pinion. The pinion in the differential gear system is connected through the clutch with the engine output shaft. The torque adjusting means preferably connects the first brake through the first ring gear with the second pinion and the second brake is connected through the second ring gear with the first pinion.

DESCRIPTION OF THE PREFERRED EMBODIMENTS

Figure 1:
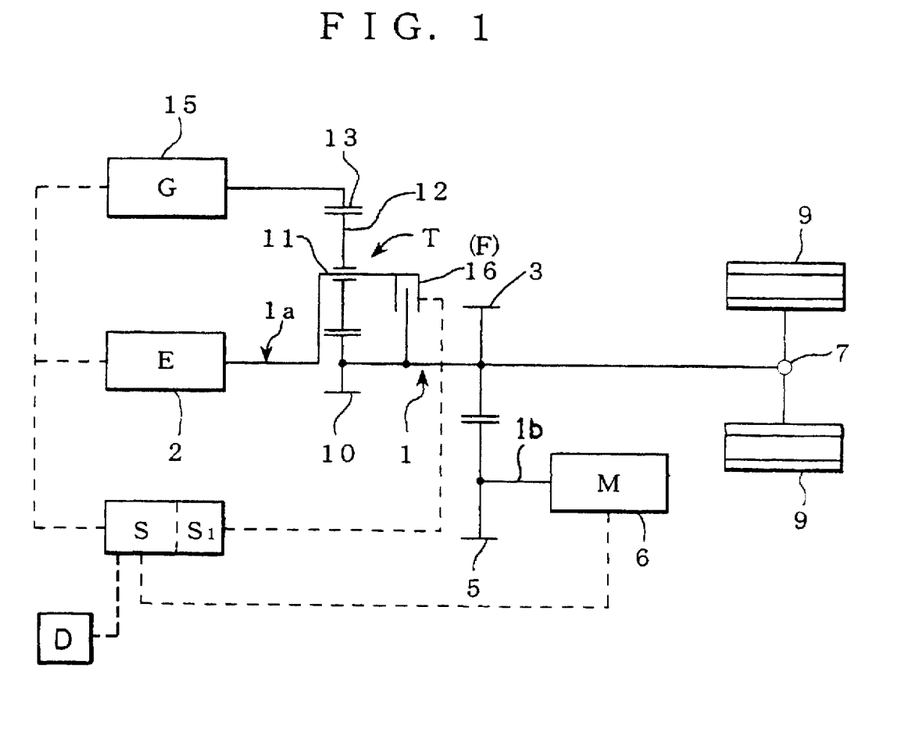
FIG. 1 is a schematic diagram of a hybrid vehicle in the first embodiment according to the present invention.

The preferred embodiments of the present invention will now be described in detail with reference to the drawings.
FIRST EMBODIMENT In the hybrid vehicle of the first embodiment, as shown in FIG. 1, a drive shaft 1 is connected to receive from both an engine output shaft 1a and a motor output shaft 1b. The engine output shaft 1a connects at one end with an engine 2, and the drive shaft 1 connects through gears 3, 5 with motor shaft 1b, and further connects at one end, through a differential gear device 7, with vehicle wheels 9. The other ends of the engine output shaft 1a and the drive shaft 1 connect with each other through a torque adjusting means T.

The torque adjusting means T is formed as a planetary gear unit composed of a carrier 11 united with the engine output shaft 1a, a pinion 12 rotatably supported on the carrier 11, a sun gear 10 fixed to the drive shaft 1 and meshed with the pinion 12, a ring gear 13 meshed with the pinion 12, and a clutch 16 (a frictional engagement means F) connecting the engine output shaft 1a and the drive shaft 1. Incidentally, the ring gear 13 is connected to a generator 15.

The controller S is used as a control means and controls engine speed of the engine 2 in response to the driving state of the vehicle, ON/OFF switching of the clutch 16, and other conditions such as load (generating power) of the generator 15 and rotation of the motor 6 sensed by the detector D. Furthermore, the controller S includes a slip control means S1 to control clutch pressure for the clutch 16 which changes in response to change in speed of the engine 2 to thereby regulate degree of slip of the clutch 16.

Figure 2:
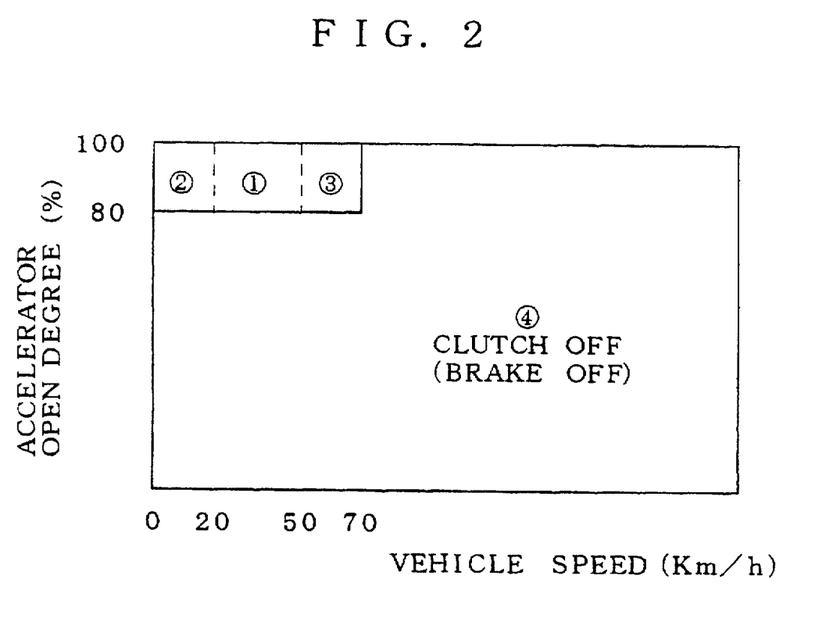
FIG. 2 is a graph of degree of accelerator opening versus vehicle speed showing the various control modes for the hybrid vehicle in the first embodiment according to the present invention.
Figure 3:
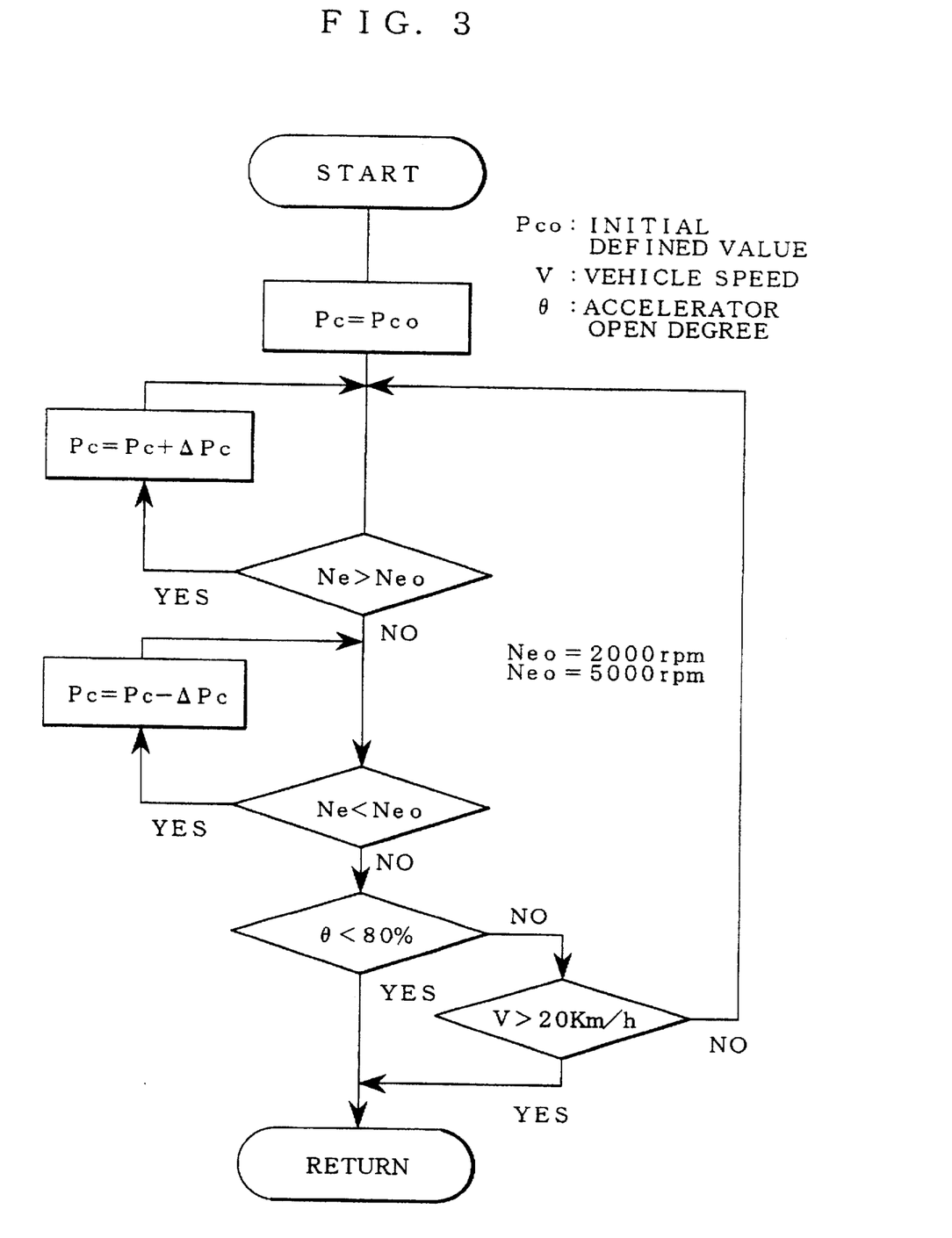
FIG. 3 is a control routine flowchart for the first embodiment according to the present invention.

The hybrid vehicle of the first embodiment is controlled as shown in FIGS. 2 and 3.

Area ④ in FIG. 2 represents a normal driving mode in which the clutch 16 is "OFF" (released), and the generator 15 generates electric power thereby imposing a load on the ring gear 13.

When the ratio (Zr/Zs) of gear tooth number Zs of the sun gear 10 to gear tooth number Zr of the ring gear 13 is defined, for example, as 2, one third of the engine torque Te is transferred from the engine output shaft 1a to the drive shaft 1b, with the result that an engine output, minus output required by the generator 15, is combined with motor output.

In area ② where the vehicle speed is less than 20 km/h and the degree of accelerator opening is over 80% as shown in FIG. 2, the engine speed Ne is maintained at a predetermined engine speed (e.g. Neo=2,000 rpm) by regulating the clutch pressure Pc by means of the controller S as shown in a flowchart described in FIG. 3.

That is, when the engine speed Ne is larger than the defined target engine speed 2,000 rpm, the pressure of the clutch 16 is increased to reduce slippage in the clutch 16 and to increase the load on the engine output shaft 1a, whereby the engine speed is reduced to keep it at the target engine speed.

On the other hand, when the engine speed Ne is smaller than the defined target engine speed (2,000 rpm), the pressure of the clutch 16 is reduced to increase slippage in the clutch 16 and to reduce the load on the engine output shaft 1a, whereby the engine speed increases to keep the target engine speed.

Figure 4:
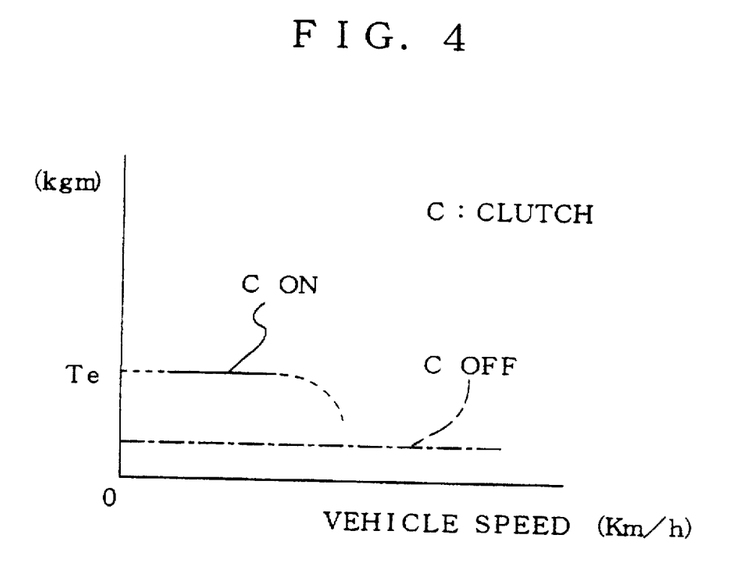
FIG. 4 is a graph of engine torque versus vehicle speed for the first embodiment according to the present invention.

As previously mentioned, the output of the engine 2, which is controlled by the clutch 16 is transferred via the planetary gear unit to the motor output shaft 1b, and there combined with the motor output to drive the vehicle wheels 9. The dotted line portions in FIG. 4 illustrate a range for clutch slip for adjusting the engine speed.

Figure 5:
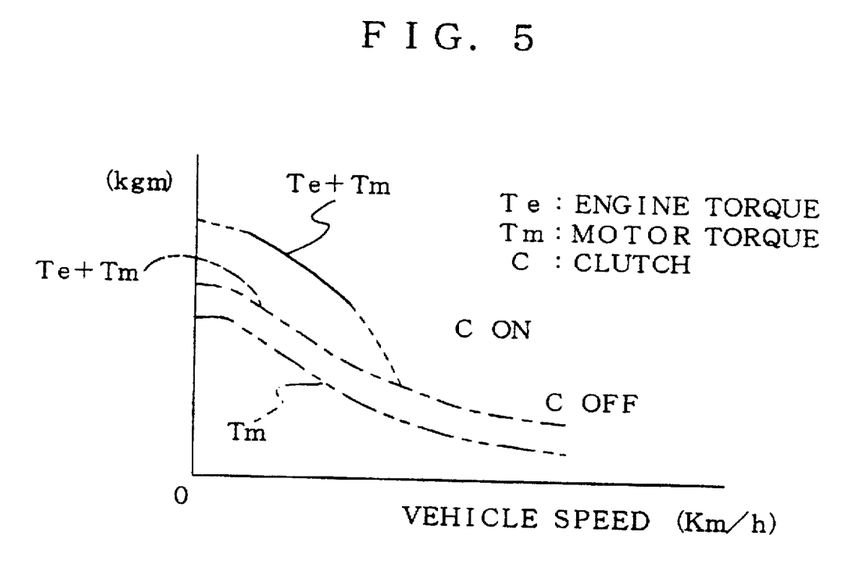
FIG. 5 is graph of output torque versus vehicle speed for the first embodiment according to the present invention.

In FIG. 2, area ①, wherein the vehicle speed is 20 km/h–50 km/h and the degree of accelerator opening is over 80% represents the hybrid vehicle driving at a low speed and being rapidly accelerated (under a high load), in which the clutch 16 becomes "ON" (the directly connecting state of the engine output shaft 1a and the drive shaft 1), and the electric power generation by the generator 15 is suspended with release of the load on the ring gear 13. Therefore, in this area, the rotational speed of the engine output shaft 1a is directly transferred without change to the drive shaft 1b. As a result, as compared with the case where the clutch 16 is "OFF" in the aforementioned area ④, it is known that the torque transferred from the engine output shaft 1a to the drive shaft 1b is increased by a multiple of three. In other words, the engine torque Te, when the vehicle is rapidly accelerated from low speed (at the low engine speed), is increased (see FIG. 4) to provide satisfactory combined torque (the engine torque Te+the motor torque Tm), as shown in FIG. 5, by transfer of the required engine output to the drive shaft 1. Therefore, the engine output increase, which is proportional to the increase in the engine speed, can be directly and unchangeably transferred to the drive shaft 1b to thereby provide satisfactory output to the vehicle wheels 9 when a large torque is required.

On the other hand, area ③, wherein the vehicle speed is over 50 km/h and the degree of accelerator opening is over 80%, represents an increased target engine speed (e.g. Neo=5,000 rpm) with control the engine speed as in the aforementioned area ①.

Accordingly, in the aforementioned embodiment, satisfactory driving torque can be obtained by switching the clutch 16 (here serving as the torque adjusting means T) to "ON" and further releasing the load caused by the generator 15 when the high torque is required. When the vehicle is in its normal driving mode, since the vehicle wheels 9 can be driven while the generator 15 generates electric power from the predetermined output produced by the engine 2 while operated with high efficiency and low-pollution.

In this first embodiment, the engine output shaft 1a and the drive shaft 1b are connected through the planetary gear unit system, operating as the torque adjusting means T, when the vehicle moving at low speed and is required to immediately accelerate (high load), so that the output of the engine 2 is directly transferred to the drive shaft 1b, whereby an effective power transfer can be assured.

Since the engine torque can be increased by the torque adjusting means T a large motor 6 as conventionally used is unnecessary, and the motor 6, the generator 15 and so on can be designed small in size, whereby the hybrid vehicle itself can be designed small in size and light in weight.

Furthermore, since the engine torque can be increased by the torque adjusting means T according to this first embodiment, the vehicle is moved only by the engine 2 with the clutch "ON" (fully engaged) even if the generator 15 and the motor 6 are not in operation.

In this first embodiment and in the following embodiments, the generator 15 may work as a motor. The generator/motor would work as a generator with the clutch "OFF" and would generate driving force operating as a motor during the clutch in "ON", so that the vehicle moves by the driving force from the motor 15 in addition to the driving force from the engine 2 and the motor 6.

SECOND EMBODIMENT

Figure 6:
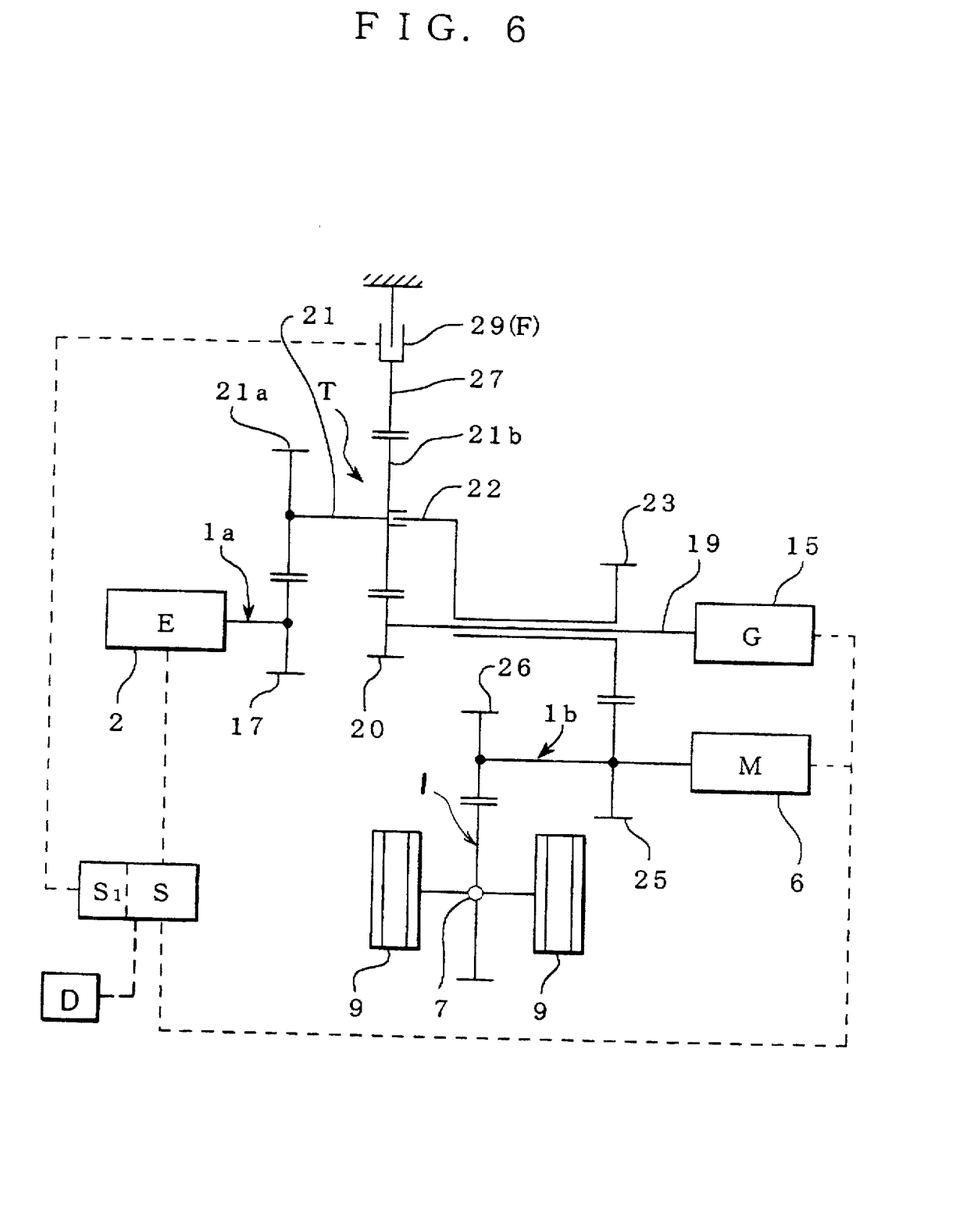
FIG. 6 is a schematic diagram of a hybrid vehicle according to a second embodiment of the present invention.

In the hybrid vehicle in the second embodiment as shown in FIG. 6, the output shaft 1 is divided into the engine output shaft 1a and the drive shaft 1b, which are oriented in parallel and are connected with each other through the torque adjusting means T. The engine output shaft 1a connects at its one end with the engine 2 and at its other end with a first sun gear 17.

An input shaft 19 of the generator 15 is aligned with the engine output shaft 1a. The input shaft 19 of the generator 15 connects at one end (at its one end close to the engine 2) with a second sun gear 20 and at the other end with the generator 15.

The first sun gear 17 and second sun gear 20 mesh with a pinion 21 which includes a first pinion 21a meshed with the first sun gear 17 and, integral with first pinion 21a, a second pinion 21b meshed with the second sun gear 20. The pinion 21 is rotatably supported by the carrier 22. The carrier 22, in turn, is rotatably supported on the input shaft 19 connecting with the generator 15 and is connected through gears 23 and 25 with the drive shaft 1b. Incidentally, the drive shaft 1b is connected through a gear 26 with a differential gear device 7 and the vehicle wheels 9 to thereby transfer the driving force from the motor 6 to the vehicle wheels 9.

A ring gear 27 is meshed with the pinion 21 and is selectively engageable by a brake 29 (the frictional engagement means F).

The torque adjusting means T is a planetary gear unit composed of the aforementioned first sun gear 17, second sun gear 20, pinion 21, ring gear 27, brake 29 and carrier 22.

The controller S is connected with the engine 2, brake 29, generator 15 and motor 6. The slip control means S1 included in the control means S controls pressure for the brake 29 which changes in response to the speed variation of the engine 2 to thereby regulate degree of slip of the brake 29.

The hybrid vehicle of this second embodiment is controlled, as shown in FIGS. 2 and 3, i.e. as in the aforementioned first embodiment.

In area ④ in FIG. 2, the brake 29 is kept in "OFF" (released state) and the generator 15 generates electric power, whereby the load of the generator 15 is imposed on the second sun gear 20.

A torque 0.8 times an engine torque Te is transferred from the engine 2 to the drive shaft when the gear tooth number of the first pinion 21a is 17, the gear tooth number of the second pinion 21b is 40, the gear tooth number of the second sun gear 20 is 20, the gear tooth number of the first sun gear 17 is 43, and the gear tooth number of the ring gear 27 is 100. The engine output, minus output required to drive the generator 15, is combined with the output of the motor 6 in drive shaft 1b so as to drive the vehicle wheels 9.

In area of operation ② where the vehicle speed is less than 20 km/h and the degree of accelerator opening is over 80% as shown in FIG. 2, the engine speed Ne is controlled to be maintained at a predetermined engine speed (e.g. Neo=2,000 rpm) by regulating the brake pressure Pc by means of the controller S as shown in the flowchart of FIG. 3.

That is, when the engine speed Ne is larger than the defined target engine speed 2,000 rpm, the pressure of the brake 29 is increased to reduce slippage in the brake 29 and to increase the load on the engine output shaft 1a, whereby the engine speed is reduced to keep the target engine speed.

On the other hand, when the engine speed Ne is lower than the defined target engine speed 2,000 rpm, the pressure of the brake 29 is reduced to increase slippage in the brake 29 and to reduce load on the engine output shaft 1a, whereby the engine speed is increased to keep the target engine speed.

As mentioned above, the output according to the engine 2, operating at a speed controlled by the brake 29, is transferred via the planetary gear unit to the drive shaft 1b, and combined there with the output of the motor to drive the vehicle wheels 9. The dashed portion of the upper line in FIG. 4 illustrates slippage of the brake 29 in order to adjust the engine speed.

In FIG. 2, as explained in the first embodiment, the area ① wherein the hybrid vehicle is travelling at a low speed and is required to immediately accelerate (under a high load) represents operation with the brake 29 "ON" so as to lock the ring gear 27, and the electric power generation by the generator 15 is suspended and the load on the second sun gear 20 is released. Consequently, while the engine output shaft 1a rotates once, the carrier 22 makes 0.5 revolution, with the result that twofold the engine torque Te is transferred from the engine 2 to the drive shaft 1b. As a result, in the case of operation in area ①, the torque transferred from the engine 2 to the drive shaft 1b is increased two and a half times as compared with the case of ④, so that satisfactory output (torque) as shown in FIG. 5 can be ensured as in the aforementioned first embodiment.

Area of operation ③ in FIG. 2 represents the engine speed controlled at 5,000 rpm as in the aforementioned case of ①.

Accordingly, in the second embodiment, the engine output increases in proportion to the increase of the engine speed and is combined with the motor output by switching the brake 29 as the torque adjusting means T to "ON" and further by releasing the load of the generator 15 when the large output torque is required, whereby the desired driving state for the vehicle can be assured as in the first embodiment.

THIRD EMBODIMENT

Figure 7:
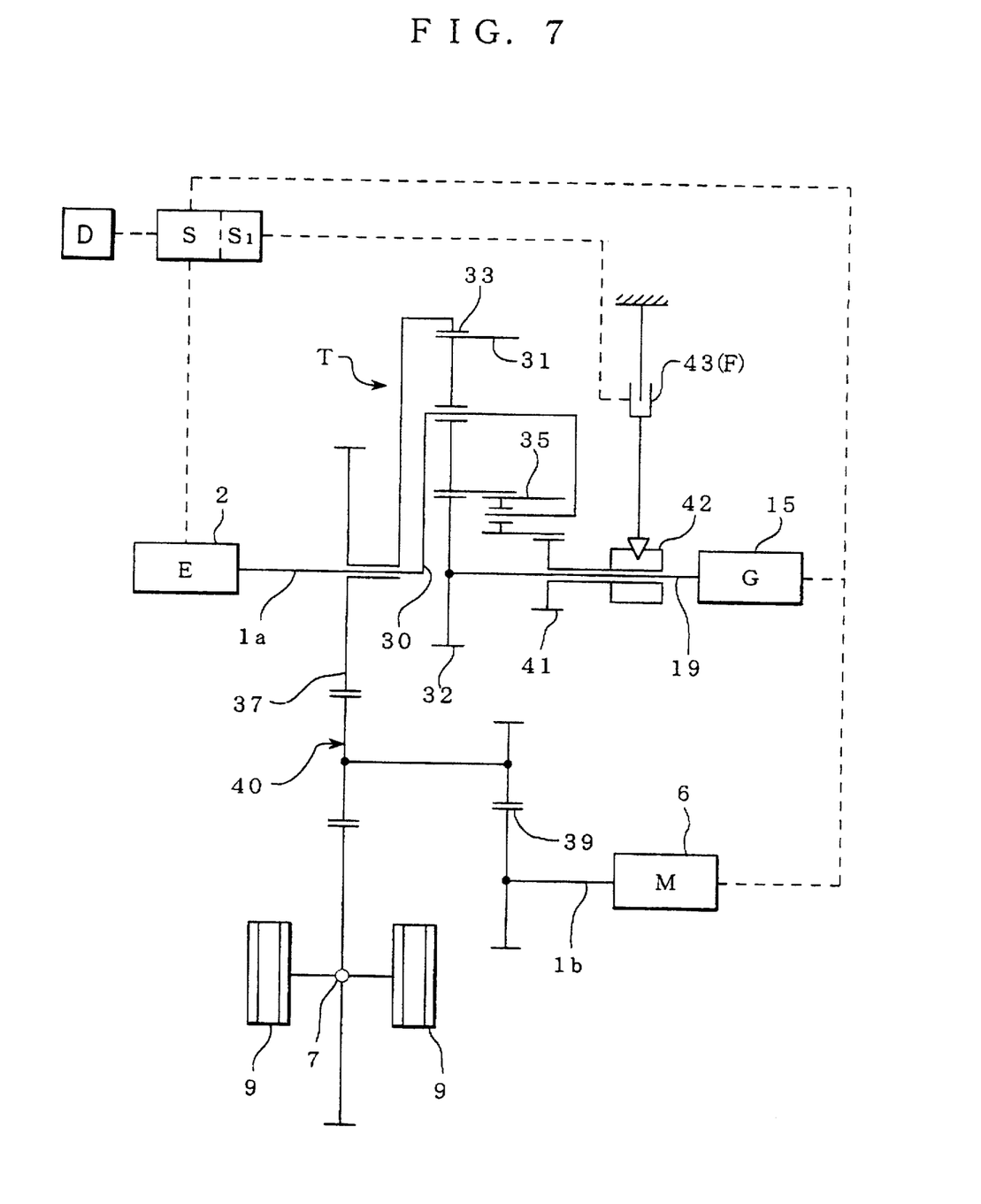
FIG. 7 is a schematic diagram of a hybrid vehicle according to a third embodiment of the present invention.

In the hybrid vehicle of the third embodiment as shown in FIG. 7, the engine output shaft 1a and the drive shaft 1b are oriented in parallel and are connected with each other through the torque adjusting means T. The engine output shaft 1a connects at its one end with the engine 2 and rotatably supports a first pinion 31 at its other end through a carrier 30. Incidentally, the carrier 30 rotatably supports thereon a second pinion 35 meshing with the first pinion 31.

An input shaft 19 of the generator 15 is aligned with the engine output shaft 1a. The input shaft 19 of generator 15 connects at its one end (at its end closer to the engine 2) with a first sun gear 32 meshing with the first pinion 31 and at its other end with the generator 15.

The aforementioned first pinion 31 meshes with a ring gear 33 rotatably supported on the engine output shaft 1a. The ring gear 33 is integrally connected with gear 37.

Incidentally, the motor output shaft 6' is connected through gears 39, 40 with the differential gear unit 7 and the vehicle wheels 9 to thereby transfer the driving force from the motor 6 to the vehicle wheels 9.

The second pinion 35 meshes with a second sun gear 41 which, in turn, is connected to the generator input shaft 19 through a one-way clutch 42 by operation of a brake 43 (the frictional engagement means F). Incidentally, the one-way clutch 42 allows the second sun gear 41 to rotate in the same direction as that of the first pinion 31.

The controller S is connected with the engine 2, generator 15, motor 6 and brake 43. The slip control means S1 of the controller S regulates slippage in the brake 43.

The torque adjusting means T includes the planetary gear unit composed of the aforementioned first pinion 31, first sun gear 32, second sun gear 41, ring gear 33, carrier 30, second pinion 35 and brake 43.

The hybrid vehicle of this embodiment is controlled as shown in FIGS. 2 and 3, i.e. as in first and second embodiments. That is, in operation area ④ shown in FIG. 2, the brake 43 is kept in "OFF" (released state), and the generator 15 generates electric power thereby imposing a load on the first sun gear 32.

A torque 0.8 times the engine torque Te is transferred from the engine 2 to the drive shaft 1b when, for example, the gear tooth number of the second sun gear 41 is 47, the gear tooth number of the first sun gear 32 is 20, and the gear tooth number of the ring gear 33 is 80.

In FIG. 2, as explained in the first and second embodiments, in operational area ① when the hybrid vehicle is being rapidly accelerated from a low speed (under high load), the brake 43 becomes "ON", the electric power generation by the generator 15 is suspended, the load on the first sun gear 32 is released, and the second sun gear 41 is locked. Consequently, while the engine output shaft 1a rotates once the ring gear 36 makes 0.41 revolutions, with the result that a torque 2.4 times the engine torque Te is transferred from the engine 2 to the motor 6. As a result, in operational area ①, the torque transferred from the engine 2 to the drive shaft 1b becomes three times that so transferred in the case of ④, so that the satisfactory output (torque) as shown in FIG. 5 can be ensured, as in the aforementioned first embodiment.

In operation areas ② and ③ of FIG. 2, the speed of the engine 2 is controlled as in the first and second embodiments.

Accordingly, in this third embodiment, the same effect as in the first and second embodiments can be obtained. Furthermore, since the second sun gear 41 can rotate in the same direction as that of the first sun gear 32 with the one-way clutch 42 provided between the second sun gear 41 and the brake 43, when the brake 43 is switched to "ON" and the load of the generator 15 is released, it is unnecessary to control the operation to synchronize operation of the brake 43 with that of the generator 15, because the load caused by the generator 15 is released after switching the brake 43 to "ON".

FOURTH EMBODIMENT

Figure 8:
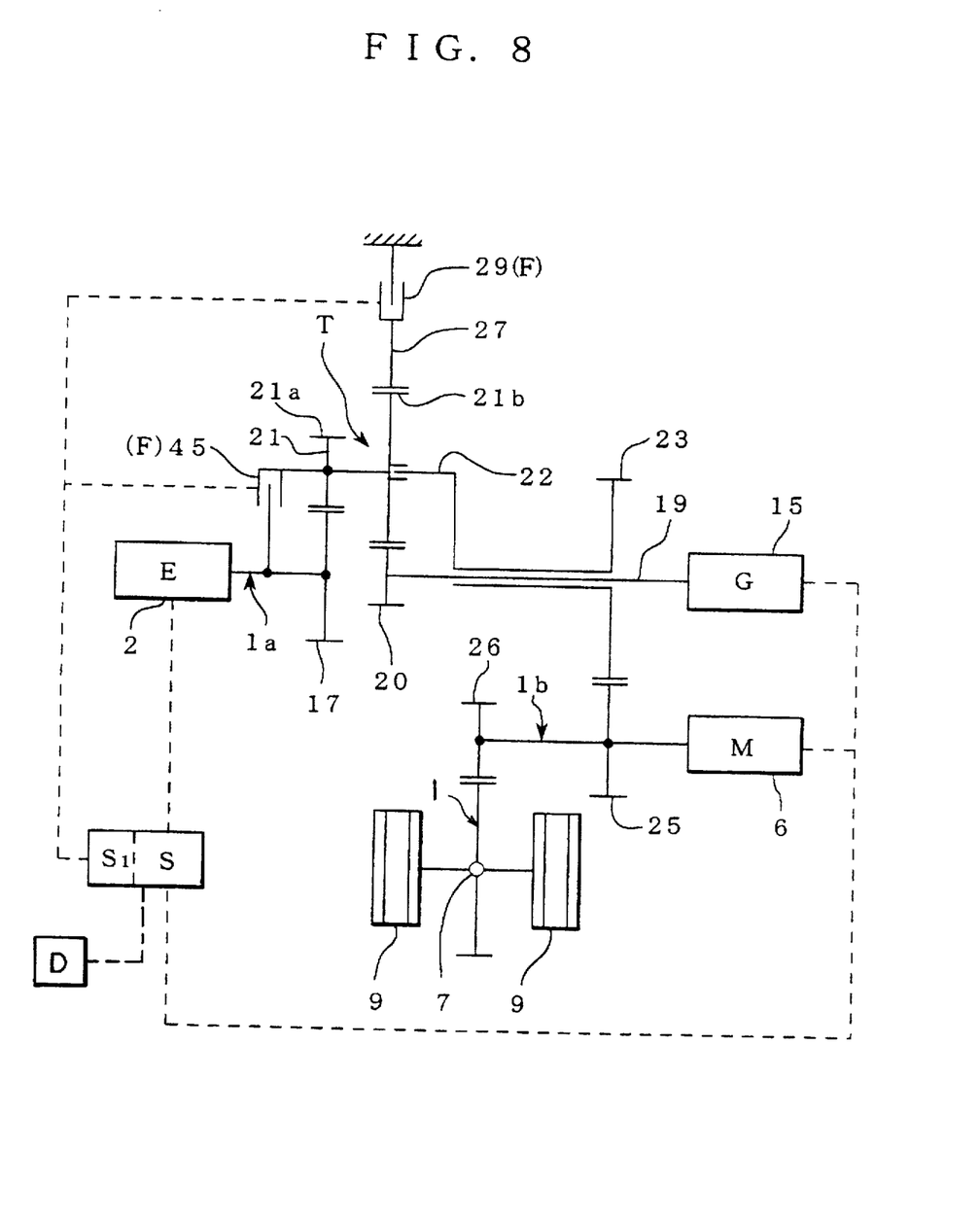
FIG. 8 is a schematic diagram of a hybrid vehicle according to a fourth embodiment of the present invention.

This fourth embodiment, shown in FIG. 8, is a modification of the second embodiment, in which the pinion 21 of the second embodiment is connected through a clutch 45 with the engine output shaft 1a. The other components of this fourth embodiment are the same as the second embodiment, so that the description thereof will be omitted and the same reference numerals are used to designate components the same as FIG. 6.

Figure 9:
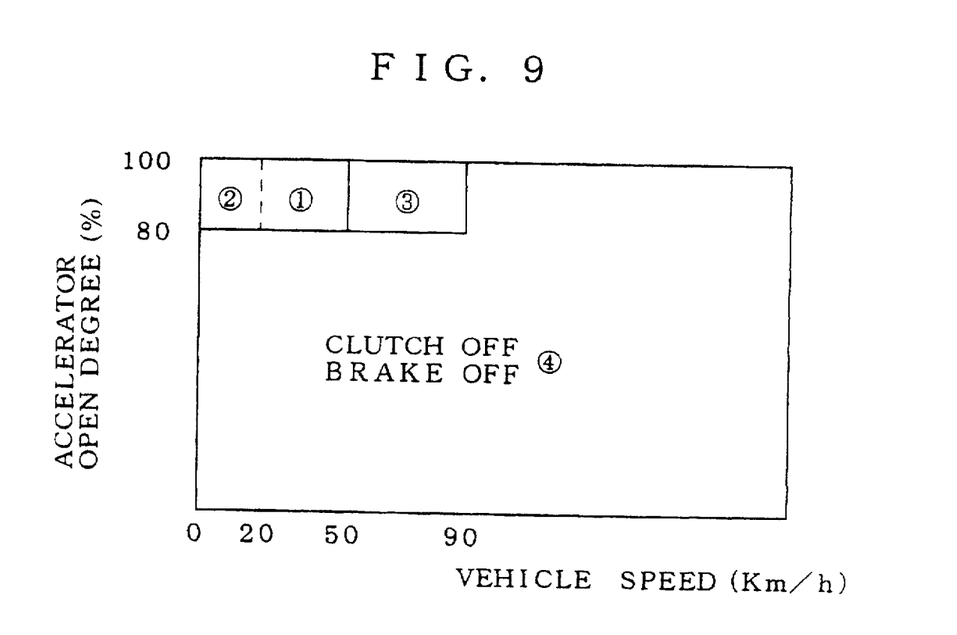
FIG. 9 is a graph of degree of accelerator opening versus vehicle speed showing the different control modes for the hybrid vehicle of the fourth embodiment according to the present invention.
Figure 10:
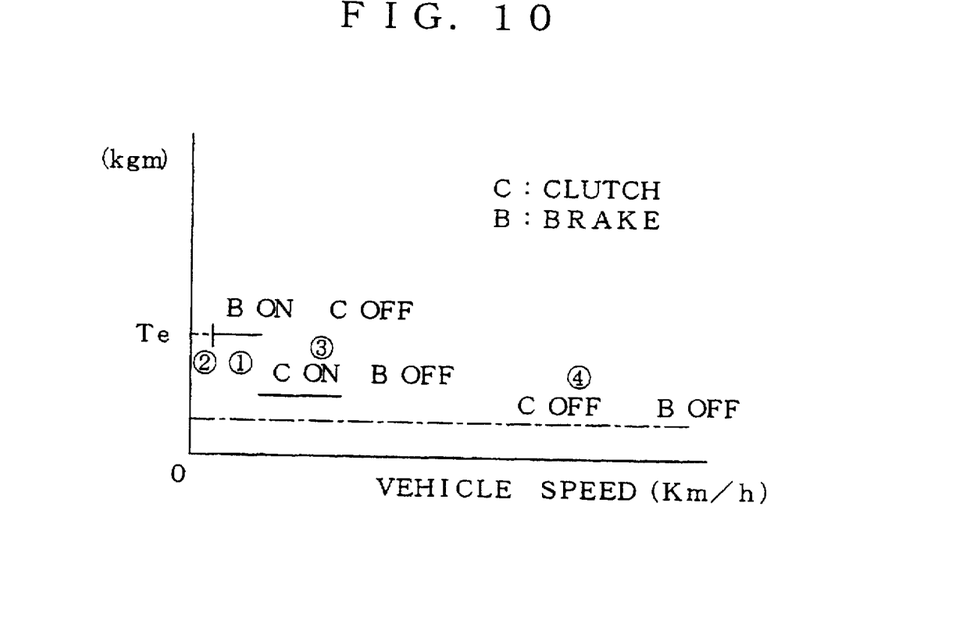
FIG. 10 is a graph of engine torque versus vehicle speed for the hybrid vehicle in the fourth embodiment according to the present invention.

The hybrid vehicle of this fourth embodiment is controlled as shown in FIGS. 9 and 10.

In FIG. 9, in operational area ④ the clutch 45 and brake 29 are "OFF" and the generator 15 generates electric power, whereby the load of the generator 15 is imposed on second sun gear 20. In this case, a torque 0.8 times the engine torque Te is transferred from the engine 2 to the drive shaft 1b.

In operational area ②, wherein the vehicle speed is less than 20 km/h and the accelerator opening is over 80%, the engine speed is maintained at lower than the predetermined engine speed (e.g. 2,000 rpm) by regulating the brake pressure.

Operational area ① represents operation with a vehicle speed between 20 km/h–50 km/h and an accelerator opening of over 80%, and wherein the clutch 45 is "OFF" but the brake 29 is "ON". In this area, while the engine output shaft 1a rotates once the carrier 22 makes 0.5 revolutions, with the result that a torque 2 times the engine torque Te is transferred from the engine 2 to the drive shaft 1b. As a result, in the case of ①, the torque transferred from the engine 2 to the drive shaft 1b is increased 2.5 times as compared with the case of ④ (see FIG. 10). Incidentally, the generation by the generator 15 is suspended in operational area ①.

Operation area ③ means the vehicle speed is between 50 km/h–90 km/h, the accelerator opening is over 80%, and the clutch 45 is "ON" but the brake 29 is "OFF". In this case, while the engine output shaft 1a rotates once the carrier 22 makes one revolution, with the result that a torque the same as the engine torque Te is transferred from the engine 2 to the drive shaft 1b. As a result, in operational area ③, the torque transferred from the engine 2 to the output shaft 1b is increased 1.25 times as compared with the case of ② (see FIG. 10). Incidentally, the generation by the generator 15 is suspended in area ③.

Figure 11:
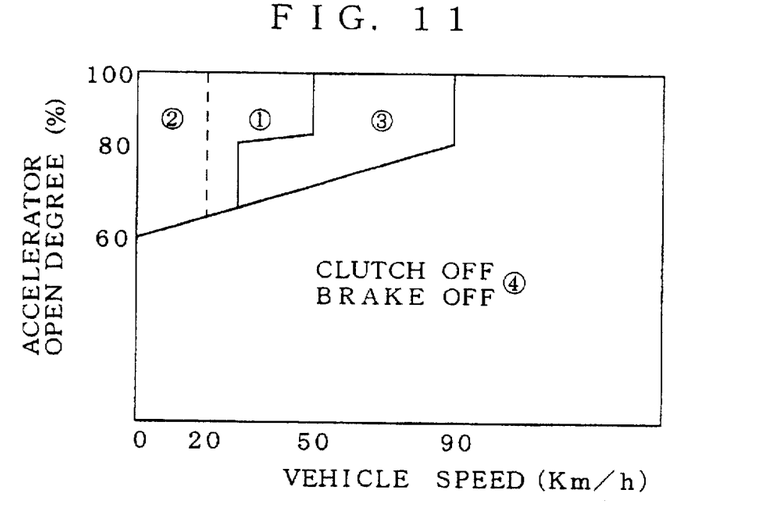
FIG. 11 is a graph of degree of accelerator opening versus vehicle speed showing control modes of the hybrid vehicle in the fourth embodiment according to the present invention.

Accordingly, in the fourth embodiment, as in the aforementioned embodiments, when the vehicle moves at a low speed and is immediately accelerated (area ① in FIG. 9), the torque transferred from the engine 2 to the drive shaft can be increased, whereby the same effect as other embodiments is properly obtained, and further the torque transferred from the engine 2 to the drive shaft 1b can be changed as described above, whereby the torque adjustment can be effected. Incidentally, as shown in FIG. 11, minute torque adjustment is facilitated by incrementally controlling the clutch 45 and the brake 29 in response to the degree of accelerator opening and the vehicle speed.

FIFTH EMBODIMENT

Figure 12:
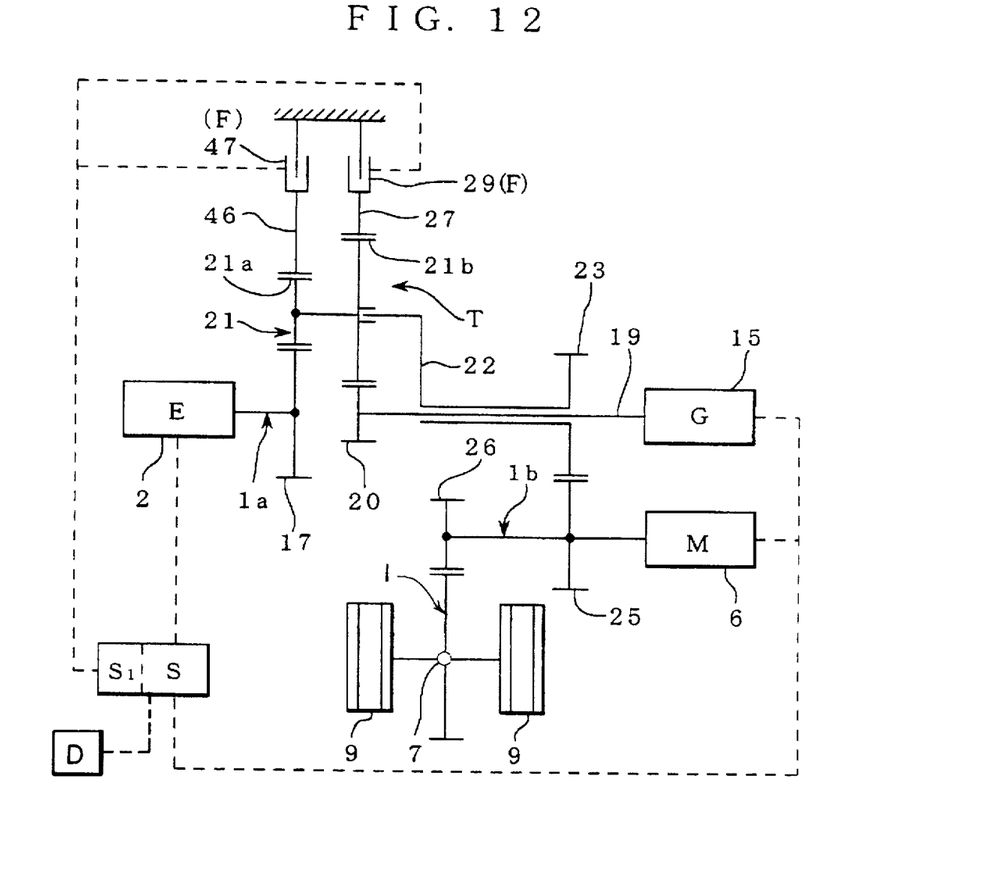
FIG. 12 is a schematic diagram of the hybrid vehicle of the fifth embodiment according to the present invention.

The fifth embodiment of FIG. 12 is another example of modification of the second embodiment. As in the fourth embodiment, a ring gear (a second ring gear) 46 meshes with the first pinion 21a, which is part of the pinion 21, and a brake (a second brake) 47 for controlling rotation of the ring gear 46 is provided in addition to the ring gear (the first ring gear) 27 and brake (the first brake) 29 of the second embodiment. Incidentally, the other components of this fifth embodiment are the same as those of the second embodiment, so that the description will be omitted and the same reference numerals to designate those components which are the same as in FIG. 6.

Figure 13:
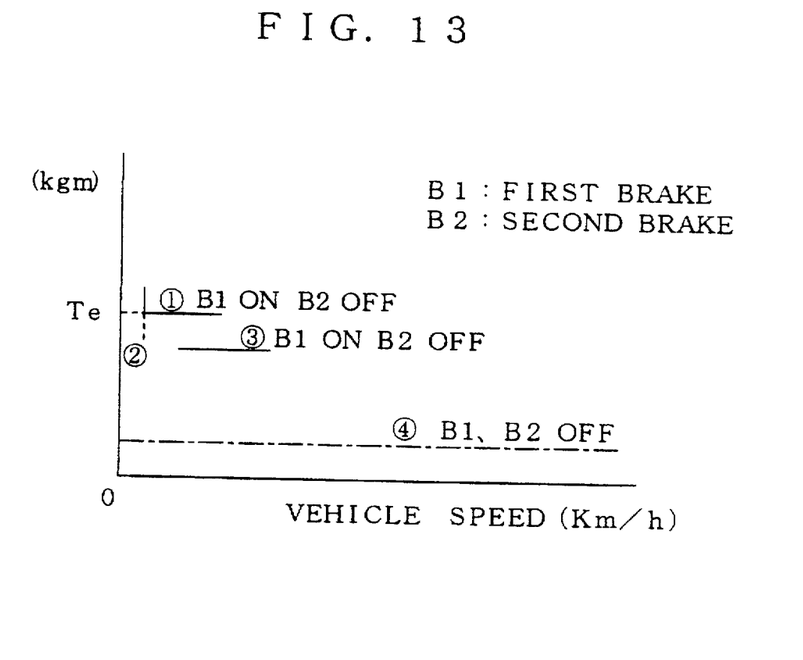
FIG. 13 is a graph of engine torque versus vehicle speed for the hybrid vehicle of the fifth embodiment according to the present invention.

The hybrid vehicle of this fifth embodiment is controlled as shown in FIGS. 9 and 13.

In FIG. 9, in operational area ④ the first brake 29 and the second brake 47 are kept "OFF" and the generator 15 generates electric power thereby imposing a load on the second sun gear 20. In this case, a torque 0.8 times the engine torque Te is transferred from the engine 2 to the drive shaft 1b.

In operational area ② the vehicle speed is less than 20 km/h, and the degree of accelerator opening is over 80%, and the engine speed is maintained at the predetermined engine speed (e.g. 2,000 rpm) by regulating the brake pressure.

In operational area ① the vehicle speed is between 20 km/h–50 km/h and the degree of accelerator opening over 80%, the first brake 29 is "OFF" and the second brake 47 is "ON". In operational area ①, the engine output shaft 1a rotates once for every 0.3 revolutions of carrier 22, with the result that 2.8 times the engine torque Te is transferred from the engine 2 to the drive shaft 1b. As a result, in the case of ①, the torque transferred from the engine 2 to the drive shaft 6 is increased 3.5 times as compared with the case of ② (see FIG. 13). Incidentally, operation of the generator 15 is suspended in this case also.

In operational area ③ the vehicle speed is between 50 km/h–90 km/h and the degree of accelerator opening is over 80%, the first brake 29 is "ON" and the second brake 47 is "OFF". In this case, the engine output shaft 1a rotates once while the carrier 22 makes 0.5 revolutions, with the result that a torque 2 times the engine torque Te is transferred from the engine 2 to the drive shaft. As a result, in the case of ③, the torque transferred from the engine 2 to the drive shaft 1b is increased 2.5 times as compared with the case of ② (see FIG. 13). Incidentally, the generation by the generator 15 is also suspended in area ③.

Accordingly, since the multiple of torque of the engine 2 transferred to the drive shaft 1b can be changed among three values, the torque adjustment can be effected more exactly as in the fourth embodiment, however, as described above, the torque increase can be much larger than in the fourth embodiment. Incidentally, as shown in FIG. 11, the minute torque adjustment is facilitated by incrementally controlling the brakes 29 and 47 in response to the degree of accelerator opening and the vehicle speed as in the fourth embodiment.

Thus, according to the present invention, when a high torque is required, for example when the vehicle is moving at a low speed and is required to immediately accelerate, the control means switches the torque adjusting means to the torque increase state so as to increase the torque while the engine speed is increased, so that the torque transferred from the engine to the vehicle wheels can be increased. On the other hand, because when the vehicle is moving normally the engine can provide the desired output with high efficiency and low-pollution, the motor and the engine can be designed small in size and light in weight.

Since the aforementioned torque adjusting means is formed as a planetary gear unit according to the present invention, the output of the engine can be combined with the output of the motor, with the result that efficient transfer of the driving force is achieved.

Furthermore, since the engine torque can be increased by the torque adjusting means T, the vehicle can be moved only by the engine 2 through the clutch or the brake even if the generator and the motor are not in operation.

The hybrid vehicle according to the present invention is capable of using the engine output with high efficiency and low-pollution. The engine may be a combustion engine such as a gasoline engine, a diesel engine or a gas-turbine engine, and the motor may be an electric motor run off an electrical power source such as a battery.

We claim:

1. A hybrid vehicle comprising:
    an internal combustion engine for driving an engine output shaft;
    a motor for driving a motor output shaft;
    a generator driven by torque input to a generator shaft;
    a drive shaft for receiving torque from at least one of said engine output shaft and said motor output shaft and for outputting the received torque to vehicle drive wheels;
    a differential gear unit including a first rotary element connected to and driven by said engine output shaft, a second rotary element connected to and driving said generator shaft and a third rotary element connecting to said drive shaft;
    a casing housing said differential gear unit;
    frictional engagement means for directly engaging said engine output shaft with said drive shaft to establish a high load drive mode and for releasing to establish a low load drive mode wherein torque is transferred from said engine to said drive shaft through said differential gear unit;
    load detection means for detecting a load demand and for generating a command signal indicative of the load demand; and
    control means for determining if the indicated load demand satisfies conditions predetermined for establishment of said high load drive mode, for disengaging said frictional engagement means to establish said low load drive mode when said predetermined conditions are not satisfied and for causing said frictional engagement means to become fully engaged when said predetermined conditions are satisfied.

2. The hybrid vehicle according to claim 1, wherein said differential gear system is a planetary gear unit having a carrier as the first element, a ring gear fixed to said generator shaft as the second element, and a sun gear as the third element.

3. The hybrid vehicle according to claim 1, wherein said load detection means includes an accelerator opening detector and a vehicle speed detector.

4. The hybrid vehicle according to claim 1, wherein torque transfer to said generator is suspended responsive to a determination that the predetermined high load conditions are satisfied.

5. The hybrid vehicle according to claim 1, wherein said frictional engagement means is a clutch.

6. The hybrid vehicle according to claim 1, further comprising slip control means for changing friction engagement pressure of said frictional engagement means to provide a controlled amount of slip.

7. The hybrid vehicle according to claim 6, further comprising engine speed detection means for detecting the rotary speed of the engine output shaft, and wherein said slip control means controls frictional engagement pressure to maintain a predetermined engine speed in a slip mode.

8. A hybrid vehicle according to claim 1, wherein said differential gear unit is a planetary gear unit;

wherein said first element is a first sun gear;

wherein said generator shaft is aligned with and driven by said engine output shaft and is released in response to a determination of satisfaction of said predetermined conditions;

wherein said second element is a second sun gear fixed to said generator shaft;

wherein said third element is a carrier which is connected through gears with said motor output shaft and which is rotatably supported on said generator shaft for rotation relative thereto; and wherein said differential gear unit further comprises:

pinion means rotatably supported by said carrier and rotatably supporting integral first and second pinions including a first pinion meshing with said first sun gear and a second pinion meshing with said second sun gear;

a first ring gear meshing with said pinion means; and a first brake for fixing said first ring gear to said casing responsive to demand for immediate acceleration while at an engine speed below a predetermined engine speed.

9. A hybrid vehicle according to claim 1, wherein said differential gear unit is a planetary gear unit composed of a carrier rotatably supporting a first pinion, a second pinion, first and second sun gears and a ring gear;

wherein said first rotary element is said carrier;

wherein said generator shaft is aligned with and driven by said engine output shaft and is released in response to a determination of satisfaction of said predetermined conditions; and wherein said second rotary element is said first sun gear meshing with said first pinion;

wherein said third rotary element is said ring gear and said ring gear is rotatably supported on the engine output shaft and meshes with said first pinion;

a second sun gear rotatably supported on said generator input shaft;

wherein said second pinion meshes with said second sun gear; and further comprising a brake for engaging said second sun gear and for fixing said second sun gear in response to a determination that said predetermined high load conditions are satisfied.

10. A hybrid vehicle according to claim 9, further comprising a one-way clutch provided between the second sun gear and the brake to allow the second sun gear to rotate in the same direction as that of the first pinion.

11. A hybrid vehicle according to claim 8 further comprising a clutch for engaging said first pinion with said engine output shaft.

12. A hybrid vehicle according to claim 8 wherein said first ring gear meshes with said first pinion and further comprising a second ring gear meshing with said second pinion and a second brake for connecting said second ring gear with said casing.

13. A hybrid vehicle comprising:

an internal combustion engine driving an engine output shaft;

an electric motor driving a motor output shaft;

a generator driven by torque input through a generator shaft;

a differential gear unit comprising first, second and third gear elements, said first gear element being connected with said internal combustion engine and said second gear element being connected with said generator;

a casing housing said differential gear unit;

first frictional engagement means for engaging said third gear element with said casing;

load detection means for detecting a load demand and for generating a command signal indicative of the load demand; and control means for determining if the indicated load demand satisfies conditions predetermined for establishment of a high load drive mode, for releasing said frictional engagement means to establish a low load drive mode when said predetermined conditions are not satisfied and for causing said frictional engagement means to become fully engaged when said predetermined conditions are satisfied.

14. The hybrid vehicle according to claim 13, wherein said load detection means includes an accelerator opening detector and a vehicle travelling speed detector.

15. The hybrid vehicle according to claim 13, wherein operation of said generator is suspended responsive to a determination that said predetermined conditions are satisfied.

16. The hybrid vehicle according to claim 13, further comprising slip control means for changing frictional engagement pressure of said frictional engagement means to provide a controlled amount of slip.

17. The hybrid vehicle according to claim 16, further comprising engine speed detection means for detecting the rotary speed of the engine output shaft, and wherein said slip control means controls frictional engagement pressure to maintain a predetermined engine speed in a slip mode.

18. The hybrid vehicle according to claim 13, wherein said differential gear unit is a planetary gear unit which comprises a first sun gear as the first element, a second sun gear as the second element, a first pinion meshing with said first sun gear and a second pinion, integral with said first pinion and meshing with said second sun gear, and a first ring gear meshing with one of said integral first and second pinions as the third element.

19. The hybrid vehicle according to claim 13, wherein said differential gear unit is a planetary gear unit which comprises a first pinion as the first element, a first sun gear as the second element, a ring gear meshing with said first pinion and driving said drive shaft, a second pinion connected with said first pinion, and a second sun gear meshing with said second pinion as said third element.

20. The hybrid vehicle according to claim 19, further comprising a one-way clutch between said second sun gear and said casing allowing said second sun gear to rotate only in the same direction as said first pinion.

21. The hybrid vehicle according to claim 18, further comprising second frictional engagement means for controlling engagement between said engine and said first pinion.

22. The hybrid vehicle according to claim 18, wherein said first ring gear meshes with said first pinion and further comprising a second ring gear which meshes with said second pinion and second frictional engagement means for braking said second ring gear on said casing.

* * * * *